United States Patent [19]

Mund

[11] 4,425,959

[45] Jan. 17, 1984

[54] MOLD FOR CASTING INTERCELL CONNECTORS

[75] Inventor: Ingo Mund, Brilon, Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 281,256

[22] Filed: Jun. 15, 1981

[30] Foreign Application Priority Data

Jun. 26, 1980 [DE] Fed. Rep. of Germany ....... 3023981

[51] Int. Cl.³ .................... B22D 19/00; B22D 21/00; B22D 25/04
[52] U.S. Cl. .................................. 164/342; 164/334; 164/338.1; 164/DIG. 1; 164/348
[58] Field of Search ................ 164/DIG. 1, 334, 348, 164/127, 371, 352, 353, 354, 332, 342

[56] References Cited

U.S. PATENT DOCUMENTS

| | | |
|---|---|---|
| Re. 23,185 | 12/1949 | Mebs .................................. 164/382 |
| 2,420,003 | 5/1947 | Miller ............................... 164/127 X |
| 3,718,174 | 2/1973 | Hull et al. ......................... 164/334 X |
| 4,033,401 | 7/1977 | Wlodawar ........................ 164/127 X |
| 4,108,417 | 8/1978 | Simonton et al. ................ 164/332 X |
| 4,175,725 | 11/1979 | Cattano ............................ 164/332 X |
| 4,327,890 | 5/1982 | Cattano ............................ 164/332 X |

Primary Examiner—Gus T. Hampilos
Attorney, Agent, or Firm—Martin A. Farber

[57] ABSTRACT

For casting bridges having cell connecting flanges or and poles, respectively, formed thereon or on the connecting lugs of lead storage battery grids use is made of molds in which mold troughs for liquid lead are developed. In order to increase the life, reduce the heating time and produce a crack-free connection of the grid lugs with the cell connecting flanges, the mold troughs of the mold are developed as individual mold segments which can be separated from each other and are assembled in a segment holder to form the entire mold. The individual mold segments can in particular for this be provided with a heat insulation for the mold trough.

15 Claims, 3 Drawing Figures

MOLD FOR CASTING INTERCELL CONNECTORS

The present invention relates to a mold for the casting on of bridges connecting the connecting lugs of sets of plates assembled in packs for lead storage batteries, said bridges having cell connecting flanges and end poles respectively, developed thereon, in which there are formed molding troughs which receive liquid lead.

In order to prepare for the casting of bridges onto the connecting lugs of the grids of lead storage batteries, the grids are assembled in the form of sets of plates so as to form packs and are so arranged and held with respect to each other in a cassette that the assembly condition of the battery is established. The lugs protrude upwards in a row so that it is possible to connect them to each other by lead which is cast thereon. At the same time the cell connector flanges are formed and the end poles are formed on the two outermost sets of plates.

For this purpose it is already known to use a casting mold, in which mold there are formed troughs which correspond to the shape of the bridges, cell connecting flanges or end poles respectively. The troughs are filled with liquid lead, the connecting lugs which have been previously brushed and pretreated with flux being dipped into said lead. The mold is then cooled from the bottom with water whereupon the removal from the mold can be effected.

The known mold has the disadvantage that due to the fact that it consists of a single part and due to its large amount of material of good thermal conductivity it takes up a large amount of heat upon the heating, cracks easily due to a different rate of heating of its individual contours when it is heated from above during the heating-up phase and cooled from below with water during the cooling phase, resulting in a temperature shock upon each cycle. The high thermal load requires high wall thicknesses which in their turn require a high expenditure of energy and thus a long heating time due to the high thermal capacitance and high thermal conductance.

In addition to these disadvantages which are inherent in the mold itself, defects occur in the product since cracks are frequently formed between connecting flanges and the associated grid lugs during the cooling as a result of the unfavorable interaction of solidification fronts. The result of this is that the corresponding plate fails prematurely and the life of the battery is thereby reduced.

The object of the invention is to lengthen the life of the molds described above and create a structure which results in a short heating time and thus a conservation of energy and makes it possible to assure a good crack-free weld-on quality between the cell connector flange and the lugs.

This objective is achieved by the invention in the manner that the mold troughs of the casting mold are formed as individual mold segments which can be separated from each other and are assembled in a segment holder to form the entire mold. This formation of the mold makes it possible, on the one hand, to reduce the high thermal stresses upon the heating and cooling of the mold and, on the other hand, to control the direction of solidification so as to avoid the formation of cracks between the shrinking flange and the superficially melted lug. In cooperation with this structure the individual mold segments are provided with heat insulation for the molding trough. Recesses which may be filled with insulating material are preferably formed in the mold segments above cooling water channels and below substantially the entire mold troughs.

In addition, heat-conduction pins and/or plates of copper can be inserted into the material of the mold segments, this being advantageous in the sense of controlled cooling in particular when—as proposed in one suitable embodiment of the invention—the mold segments are separated from each other, in the region of the mold troughs for cell connector flanges, by a steel partition plate and one or more expansion joints are provided. Due to the expansion joints between the mold segments, free expansion and contraction of the material is made possible and stresses are thereby avoided. The insulation in combination with elements suitable for the removal of heat assures that the energy necessary for the melting of the lugs can be stored in a small amount of lead and that an excellent weld-on quality is obtained.

Structurally and in order to simplify the interchangeability of the mold segments it is advantageous to form the segment support with an I-shape and to insert the mold segments between the arm portions of the I in an arrangement which conforms to the assembly in the finished lead storage battery, the mold segments being held by clamping strips which connect the arm portions. The central bar of the segment support can in such case be provided with a lead feed channel and an open overflow closure. The mold segments themselves are positioned and fixed in segment supports by tongue and groove connections which may suitably be developed as heat insulation, for instance by the provision of an air space. Furthermore each mold segment is water cooled.

As a whole the advantages of the invention are the substantially improved welding-on quality with increased life of the mold despite high temperatures, which is further improved by the replaceability of individual mold segments, savings in energy resulting from short heating times and savings in lead from the good insulation. It is furthermore proposed to arrange the flange, which in the prior art is located laterally alongside of the bridge, on the bridge itself, which is made possible in the manner that with sufficiently high lead temperature controlled solidification can be effected in accordance with the invention.

Further details, features and advantages of the invention will become evident from the following description of the accompanying drawing in which a preferred embodiment of the invention is diagrammatically shown. In the drawing.

Figure 1:
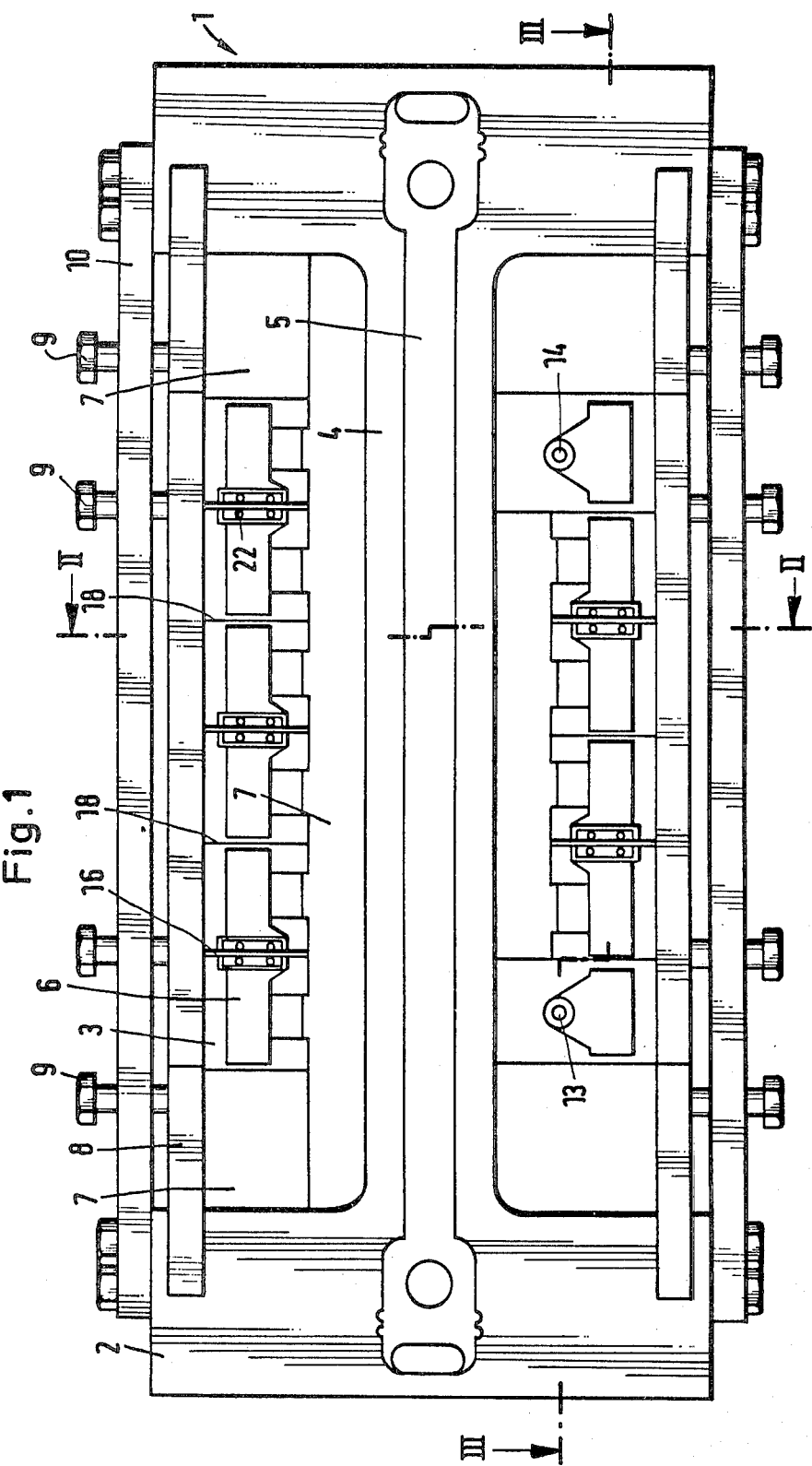
FIG. 1 is a top view of a casting mold in accordance with the invention.

The casting mold 1 is intended for use on COS machines for the casting of bridges onto the connecting lugs of lead storage-battery grids which in the form of sets of plates are formed together with the corresponding separators into packs in the manner that the connecting lugs protrude upwards in a row out of the set of plates. Such sets of plates, which are not shown in the drawing, are fixed in a cassette already in the order with respect to each other that corresponds to the arrangement in the finished battery so that by a single casting-on process, all bridges connecting the lugs and having cell connecting flanges or end poles formed thereon are produced with the mold 1.

The mold 1 comprises essentially an I-shaped segment support 2 (comprising an elongate portion and laterally extending arm portions at opposed ends of the elongate portion) as well as individual mold segments 3 which are arranged in the region of the recesses between the I arms (the arm portions) of the segment support 2. In the elongate portion which is a central bar 4 of the segment support 2 there is recessed a central feed channel 5 which is supplied via an inlet (not shown) on the one side with liquid lead which first of all fills the channel and then the entire mold including the mold troughs 6 developed in the individual mold segments 3 via a portion 3a of the feed trough constituting a top surface of the mold segments 3 and an overflow weir 3b therebetween in the top surface of the mold segments. Overfilling is impossible due to the fact that the other end of the lead feed trough 5 is provided with an overflow closure in the form of a weir over which excess lead can flow when the mold has been filled.

A total of twelve individual mold segments 3 are arranged between the arms of the segment support 2, filler members 7 being used to completely fill up the space available. The mold segments 3 which are located in a row on each side of the central bar 4 with a substantially vertical contact surface 3c facing the central feed trough 5 are held by a clamping strip or rail 8 which is inserted in opposite recesses in the arms and pressed by clamping screws 9 against the inserted mold segments 3. The clamping screws 9 are seated in an outer pressure strip or rail 10 which also connects the arms of the segment support 2 and is screwed against them by screws at their ends unnumbered.

Figure 2:
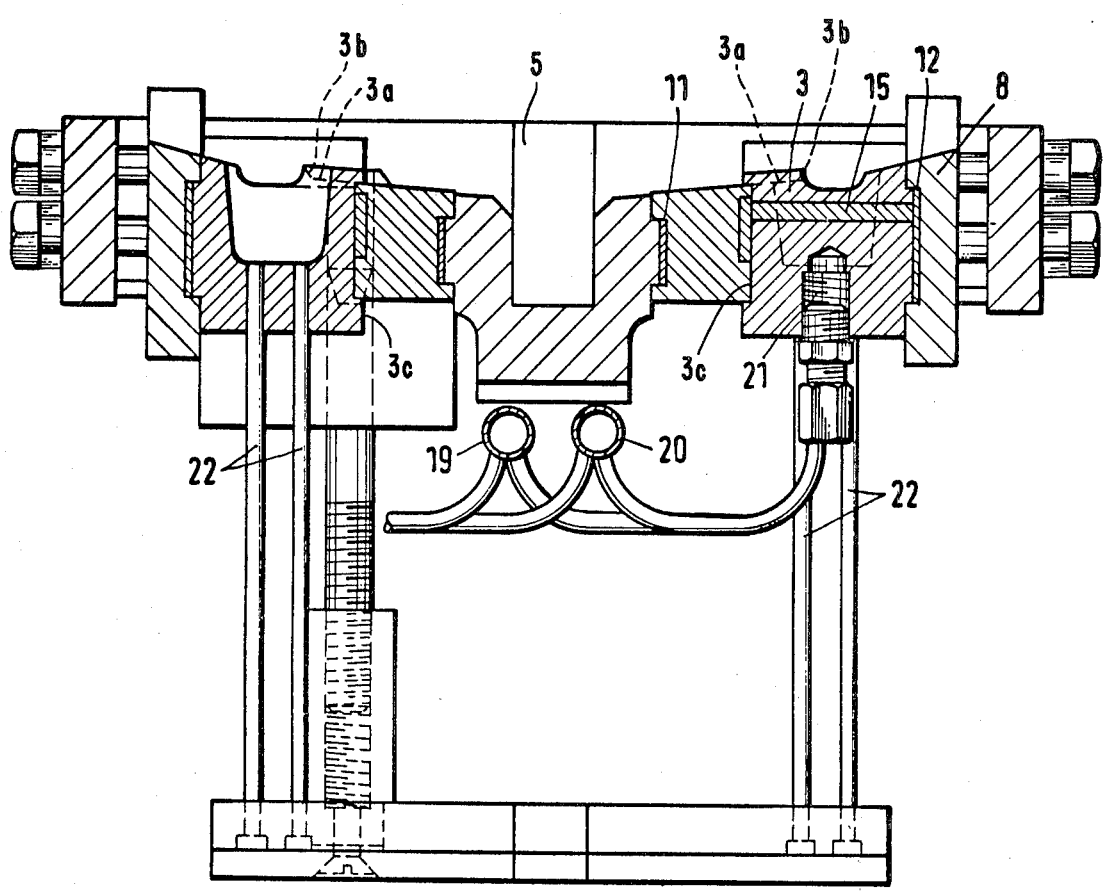
FIG. 2 is a section along the line II—II of FIG. 1.

Further details of the mounting of the mold segments with respect to each other and with respect to the segment support 2 can be noted from FIG. 2 of the drawing which shows a cross section through the mold 1. It can be seen that first of all, on the inside, a tongue and groove connection 11 holds the filler member 7 against the central bar 4 of the segment support 2 on the one hand and in connection with the outwardly adjoining mold segments 3 which in their turn are interlocked with the clamping strip 8 via a tongue and groove connection 12. The tongue and groove connections 11 and 12 are developed in heat-insulating manner, for which purpose either an air space is left or corresponding recesses are filled with an insulating material.

For the mold segments there is selected a material which is of low thermal conductivity, for instance St 1.4876 with 36% Ni. This material furthermore does not show any embrittlement at high temperatures. The mold troughs 6 are recessed in the mold segment 3, and are connected via obliquely extending surfaces with the lead feed channel 5 in the central bar 4. The shape of the mold troughs 6 corresponds to the shape of the bridges to be produced which connect the connecting lugs of the plates and have formed thereon cell connecting flanges or the two end poles with mold troughs 13, 14 of circular cross section. The mold troughs 6 and the mold segments 3 are additionally heat insulated by recesses 15 which are filled with insulating material, for instance, in the form of adjacent boreholes above cooling water channels 19, 20 and below the mold troughs 6 extending from the contact surfaces 3c substantially under the entire top surface of the mold segments 3, which are helpful for the forming of a solidification front which is controlled in specific manner. This purpose is furthermore served by the fact that in the region of the cell connector flanges, the individual mold segments 3 are separated from each other by an interposed steel partition plate 16 having a thermal conductivity, for instance, of $\lambda = 50$ W/m·k and that several heat-conduction pins 17 of copper having a thermal conductivity of $\lambda = 394$ W/m·k are arranged vertically in each individual mold segment 3 on the side opposite the connector flange. In this way the direction of solidification as a whole is controlled in such a manner that, in order to avoid the formation of cracks between the shrinking flange and the cast-on lug, lead can flow during the cooling phase from the still-molten bridge into the region of the shrinking flange. The shrinkage of the flange is minimized in this connection by spatial and temporary control of the bridge and flange temperatures and, in particular, the result is obtained that the flange shrinks before the lugs solidify with the lead of the bridges. By the insulating measures assurance is provided, on the other hand, that the region of the bridge is, however, sufficiently hot so that the lugs can melt on their surface to assure a good connection and that the bridge is also kept liquid for a sufficiently long period of time until the flange has solidified.

Figure 3:
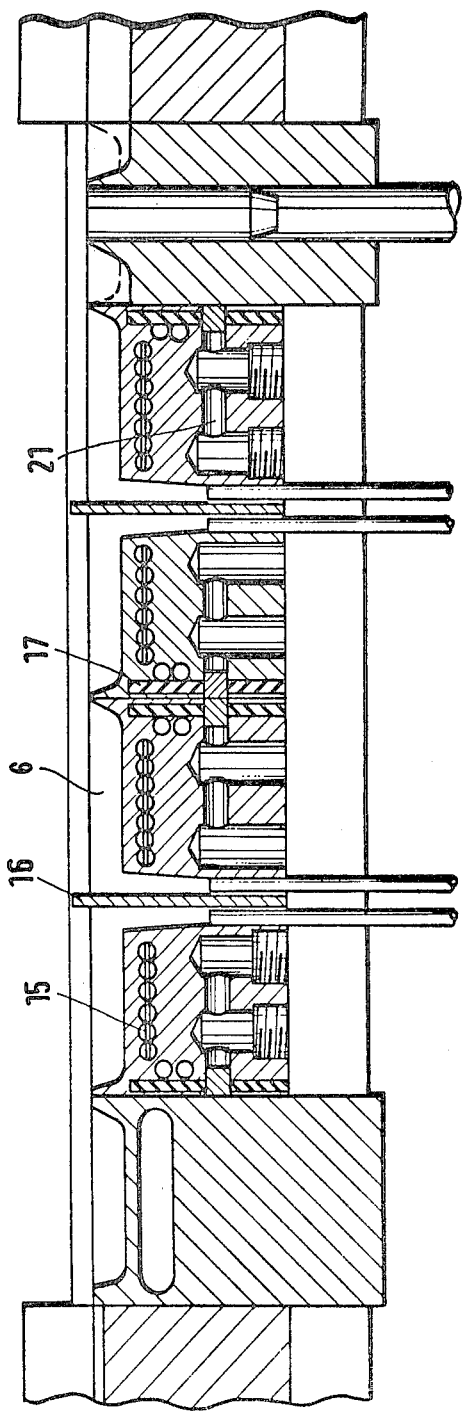
FIG. 3 is a section along the line III—III of FIG. 1.

Between every two mold segments an expansion joint 18 is left which permits free expansion and contraction of the material and thereby prevents the occurrence of stresses as a result of the large temperature differences which may occur in the mold between the heating phase (heating from above with a flame) and the cooling phase (cooling from below with water). The water-cooling connections can be noted in FIG. 2 of the drawing. In accordance therewith, the cooling water channels 19, 20 are arranged alongside of each other centrally on the segment support 2, the cooling water being fed to and discharged from the individual mold segments 3, in which accordingly cooling channels 21 are provided (see also FIG. 3 of the drawing). The cooling is effected after the above-described heating and filling of the mold have been completed and the excess lead has been discharged by opening the overflow closure. After the end of the cooling phase, the cassette containing the sets of plates and the mold can be separated from each other, for which ejectors 22 in the region of the cell connector flange are helpful. With this mold, a good quality of the welding of the lugs to the flanges is obtained, the tendency to form cracks in the region of the flanges is avoided and a long life of the mold as a whole is obtained, as well as of the mold segments individually, due to the possibility of replacing them. Finally, there is a short heating time and thus a conservation of energy as well as a saving of lead, which has an advantageous effect on costs.

I claim:

1. In a mold for casting-on bridges which connect connecting lugs of sets of plates assembled into packs for lead storage batteries, the bridges having cell connecting flanges and end poles, respectively, formed thereon, the mold comprising a plurality of individual mold segments each having a substantially vertical contact surface and being vertically separable from each other, and each of the mold segments having, at a top surface thereof, a mold trough defined therein, said mold segments being assembled in a segment support to form a complete mold, the segment support comprising an elongate portion having a central feed trough defined therein and laterally extending arm portions at opposed ends of said elongate portion, said vertical contact surface of each of said mold segments facing said elongate portion of said segment support, each said mold segments at the top surface further forming at least a portion of a feed trough communicating with the central feed trough and said mold trough, the top surface being shaped to define an overflow weir between said portion of the feed trough and said mold trough, each of the mold troughs adapted to receive liquid lead overflowing from the central feed trough, flowing along the feed trough and then flowing over the overflow weir and into the mold trough, and cooling channels defined in said mold segments extending under said mold troughs, the improvement wherein said individual mold segments having recesses defined therein constituting means for insulating said mold troughs of said individual mold segments from said cooling channels, said recesses extending from said vertical contact surfaces of said mold segments to beyond said mold trough under substantially the entire top surface of each of said mold segments which defines said at least a portion of the feed trough, said overflow weir and said mold trough of each of said mold segments, said recesses being disposed above said cooling channels to insulate substantially the entire top surface of each of said mold segments from said cooling channels.

2. The mold according to claim 1, wherein
said recesses are filled with insulating material.

3. The mold according to claim 1, further comprising heat-conduction means arranged in said individual mold segments in regions adapted for accelerated cooling.

4. The mold according to claim 3, wherein
said heat-conduction means are pins.

5. The mold according to claim 3, wherein
said heat-conduction means are plates.

6. The mold according to claim 3, wherein
said heat-conduction means are pins and plates.

7. The mold according to claim 1, further comprising partition plate means disposed in a region of said mold troughs which form cell connecting flanges, said partition plate means separating said individual mold segments from each other.

8. The mold according to claim 1, further comprising at least one expansion joint formed between said individual mold segments.

9. The mold according to claim 2, wherein
said recesses constitute parallel bores extending transversely to a longitudinal direction of said mold troughs and of said central feed trough and opening at said vertical contact surfaces.

10. The mold according to claim 1, wherein
said elongate portion of said segment support and said laterally extending arm portions are arranged to define an I-shape, said individual mold segments being inserted between said arm portions in an arrangement to define a complete mold for casting lead storage batteries, cast-on bridges and lugs, and means, comprising clamping rails connected to ends of a pair of laterally spaced arm portions on one side of said elongate portion, for holding said individual mold segments in said arrangement.

11. The mold according to claim 10, further comprising
filler members arranged between said elongate portion of said segment support and said vertical contact surfaces of said individual mold segments and operatively clamped with said individual mold segments by said clamping rails.

12. The mold according to claim 10, wherein
said elongate portion of said segment support defining said central feed trough has an openable overflow closure operatively associated with an inlet to said central feed trough.

13. The mold according to claim 1, wherein
said individual mold segments and said segment support have mating surfaces defining a tongue and groove connection.

14. The mold according to claim 13, wherein
said mating surfaces defining said tongue and groove connection define heat insulation means.

15. The mold according to claim 14, wherein
said heat insulation means constitutes an air space defined by the mating surfaces arranged to form said tongue and groove connection.

* * * * *